United States Patent
Yasunaka et al.

[11] Patent Number: 5,992,493
[45] Date of Patent: Nov. 30, 1999

[54] METHOD AND APPARATUS FOR PRODUCTION OF LAMINATED METAL SHEET

[75] Inventors: Kenji Yasunaka; Keisuke Takesue; Tadashi Fujii, all of Yamaguchi, Japan

[73] Assignee: Toyo Kohan Co., Ltd., Tokyo, Japan

[21] Appl. No.: 09/066,450

[22] PCT Filed: Nov. 1, 1996

[86] PCT No.: PCT/JP96/03219

§ 371 Date: Apr. 30, 1998

§ 102(e) Date: Apr. 30, 1998

[87] PCT Pub. No.: WO97/16311

PCT Pub. Date: May 9, 1997

[30] Foreign Application Priority Data

Nov. 2, 1995 [JP] Japan .................................. 7-309860

[51] Int. Cl.[6] .............................. B31F 5/00; B65C 9/25; B32B 31/04
[52] U.S. Cl. .......................... 156/555; 156/543; 156/322; 156/324
[58] Field of Search .................... 156/322, 324, 156/552, 543, 555

[56] References Cited

U.S. PATENT DOCUMENTS

| | | | |
|---|---|---|---|
| 4,693,175 | 9/1987 | Hashimoto | 98/31.6 |
| 5,141,430 | 8/1992 | Maus et al. | 425/556 |
| 5,149,389 | 9/1992 | Heyes et al. | 156/272.4 |
| 5,188,885 | 2/1993 | Timmons et al. | 428/198 |
| 5,364,482 | 11/1994 | Morikawa et al. | 156/182 |
| 5,639,188 | 6/1997 | Howanski et al. | 406/151 |
| 5,671,591 | 9/1997 | Fleenor | 53/452 |
| 5,699,584 | 12/1997 | Wieloch et al. | 15/256.52 |

FOREIGN PATENT DOCUMENTS

| | | |
|---|---|---|
| 60-042034 | 3/1985 | Japan . |
| 3-158234 | 7/1991 | Japan . |
| 94/21457 | 9/1994 | WIPO .................. 156/322 X |
| WO 95/04653 | 2/1995 | WIPO . |

OTHER PUBLICATIONS

English Translation of Japanese Document No. 3–158234, Apr. 1999.

*Primary Examiner*—Richard Crispino
*Assistant Examiner*—Sue A. Purvis
*Attorney, Agent, or Firm*—Browdy and Neimark

[57] ABSTRACT

A method for a production of a laminated metal sheet which can reduce the ratio of pinholes being caused in a synthetic resin film (the incidence of pinholes) upon deep draw forming of the laminated metal sheet involves superimposing the heated metal sheet on the synthetic resin film unwound from a film roll, passing the heated metal sheet and the synthetic resin film through a pair of laminating rolls to laminate the two together, the laminating process being carried out in a laminating chamber in which the concentration of fine particles having a mean particle diameter exceeding 3 $\mu$m is kept below 100 pieces/ft$^3$.

20 Claims, 6 Drawing Sheets

METHOD AND APPARATUS FOR PRODUCTION OF LAMINATED METAL SHEET

TECHNICAL FIELD

The present invention relates to method and apparatus for production of laminated metal sheet.

BACKGROUND ART

Recently, a laminated metal sheet, in which synthetic resin films such as polyester films are laminated on one side or both sides of metal sheet such as thin steel sheet or plated thin steel sheet, is applied for manufacture of sheet materials for the production of beverage cans and others. In case of forming of this laminated metal sheet into a can by deep-drawing forming, the laminated resin film protects the metal sheet from corrosion caused by the contents in the can. Further, when the laminated metal sheet is formed, there is an advantage that it does not need to be coated with lubricant as is required for uncoated metal sheet and to be, subsequently rinsed free of the lubricant, since the synthetic resin film functions as a lubricating layer.

When the laminated metal sheet is formed by deep-drawing, cracks and pinholes are sometimes generated in the synthetic resin film depending on the forming conditions. As these cracks are formed right under the flange portion, the appearance becomes unattractive. Further, the metal substrate is apt to corrode where the cracks occur, which causes durability trouble. Accordingly, various suggestions on preventing cracks have been provided, such as partial controlling of the orientation degrees of the synthetic resin film, increasing of adhesion between the metal substrate and the synthetic resin film and others (refer to International Application No. PCT/JP94/01260 and others). Generation of cracks could be substantially reduced by such means.

However, pinholes generated at random could not sufficiently be reduced even by the above-mentioned means, and the metal substrate could not sufficiently be prevented from being corroded by the contents oozing through pinholes in the plastic coating of the can, which deteriorates durability. It is the objective of the present invention to provide a laminated metal sheet in which generation of pinholes can be minimized in the deep-drawing forming and others, and the durability of cans for bevarages and others to be improved thereby.

It was found that the incidence of the above-mentioned pinholes can be reduced to some degree by changing the condition of the synthetic resin film and the condition of the surface roughness of the metal sheet. However, some elements remained almost unaffected by the change in condition of the base materials. Thus, we noticed the existence of fine particles floating in the air, as the condition other than those related with the base material. Namely, we considered that since such fine particles are adsorbed on a film surface and thereby exist between a metal sheet and a film, pinholes are generated originating from fine particles when the laminated metal sheet is formed into a can. And as a result of the cleanliness of air being heightened in the environment of the laminating (doubling) process, it was recognized that there is a high correlative relation between the class cleanliness (Federal Standards No. 209D), the standard of cleanliness of air, which shows the number of fine particles beyond 0.5 $\mu$m existing within a space of 1 ft$^3$, and the incidence of pinholes. Further, we considered that fine particles having a mean particle diameter below 3 $\mu$m do not mainly attribute to generating pinholes, and we noticed that for controlling the generation of pinholes, it is more desirable that standards for measuring the cleanliness in the environment of the laminating (doubling) process is based not on the Federal Standards, but on the concentration of fine particles having a mean particle diameter exceeding 3 $\mu$m, and also that an excess of the cleanliness of air is not needed. These matters led us to accomplish the present invention.

DISCLOSURE OF THE INVENTION

Method for producing a laminated metal sheet of the present invention is characterized in that it is a method for the production of a laminated metal sheet in which, while superimposing the heated metal sheet on the synthetic resin film unwound from a film roll, the heated metal sheet and the synthetic resin film are passed through one pair of laminating rolls so that the two are laminated with each other under pressure, and the laminating process is carried out in the environment in which the concentration of fine particles having a mean particle diameter exceeding 3 $\mu$m is kept below 100 particles/ft$^3$.

The above-mentioned laminating process is desirably practiced in the environment with the cleanliness level below class 5000, i.e. a level of 5000 or better. Further, it is desirable that unwinding of synthetic resin film from a film roll is carried out in the environment of the cleanliness level below class 20000, and thereafter laminating of the synthetic resin film with the heated metal sheet is carried out. Further, the whole production line of laminated metal sheet is desirably carried out in the environment of the cleanliness level below class 100000. Furthermore, it is preferable that the laminating process and unwinding process are carried out under somewhat elevated atmospheric pressure than surrounding atmospheric pressure.

Apparatus for production of laminated metal sheet of the present invention is characterized in that in apparatus for production of laminated metal sheet comprising an uncoiler part for unwinding systhetic resin film from a film roll, and a laminating part for laminating the unwound synthetic resin film with a heated metal sheet, the laminating roll part is provided in a laminating chamber isolating the laminating roll part from the other part, and an air cleaner is provided for keeping in the laminating chamber the concentration of fine particles having a mean particle diameter exceeding 3 $\mu$m below 100 pieces/ft$^3$.

In such an apparatus for production, the air cleaner preferably maintains the laminating chamber at a level below class 5000. Further, it is desirable that the uncoiler part is provided in an uncoiler chamber for isolating the uncoiler part from other part, and a second air cleaner is provided for keeping the uncoiler chamber at a cleanliness level below class 20000. Further, it is preferable that a line structure houses the whole of the production line of laminated metal sheet including the uncoiler chamber and the laminating chamber, and a third air cleaner is provided for keeping the cleanliness of the line structure at a level below 100000. It is desirable that pressuring equipment is provided for keeping the uncoiler chamber and the laminating chamber at somewhat elevated atmospheric pressure relative to the surrounding atmospheric pressure.

BEST MODE FOR CARRYING OUT THE INVENTION

Fine particles which cause pinholes in a laminate film have a mean particle diameter exceeding 3 μm. If the concentration of fine particles in the environment of the laminating process is below 100 particles/ft$^3$, the number of fine particles typed between the film and the metal sheet by fine particles adhering to the surface of synthetic resin film can be of the order of only 1000 pieces/m$^2$. To this extent, since the incidence of pinholes is nearly below 0.1% when the laminated metal sheet is formed into a can, such a small quantity of pinholes scarcely affects the practical production of a can. Further, since the above-mentioned concentration of fine particles corresponds nearly to class 5000 of cleanliness of Federal Standards when the fine particles are normally distributed, nearly the same effect can be obtained, even if the laminating process is carried out in the environment of class 5000, in which "to be below class" means that the concentration of fine particles is lower than the numerical value of its class.

In the unwinding process of a laminate film from a laminating roll, a particularly high degree of cleanliness is not needed. However, if the environment of such unwinding process is class 20000, the number of fine particles adhering to a synthetic resin film, which is carried to the laminating process, can be kept to be of the order of about 6000 particles/m$^2$. Further, it is difficult to airtightly divide the unwinding process from the laminating process. However, if the cleanliness in the unwinding process is below class 20000, the cleanliness in the laminating process can easily be kept. Therefore, the incidence of pinholes can be reduced further by the addition of a relatively simple device. Further, keeping the environment of the whole production line to be below class 100000 can also reduce more incidence of pinholes by the addition of a relatively simple device.

In the above-mentioned method for production, since penetrating of air having fine particles from the outside can be restrained by elevating somewhat the atmospheric pressure in the laminating process and the unwinding process than the surrounding atmospheric pressure, air cleanliness in each process can easily be maintained.

The above-mentioned method for production can be carried out using the illustrated apparatus.

Figure 1:
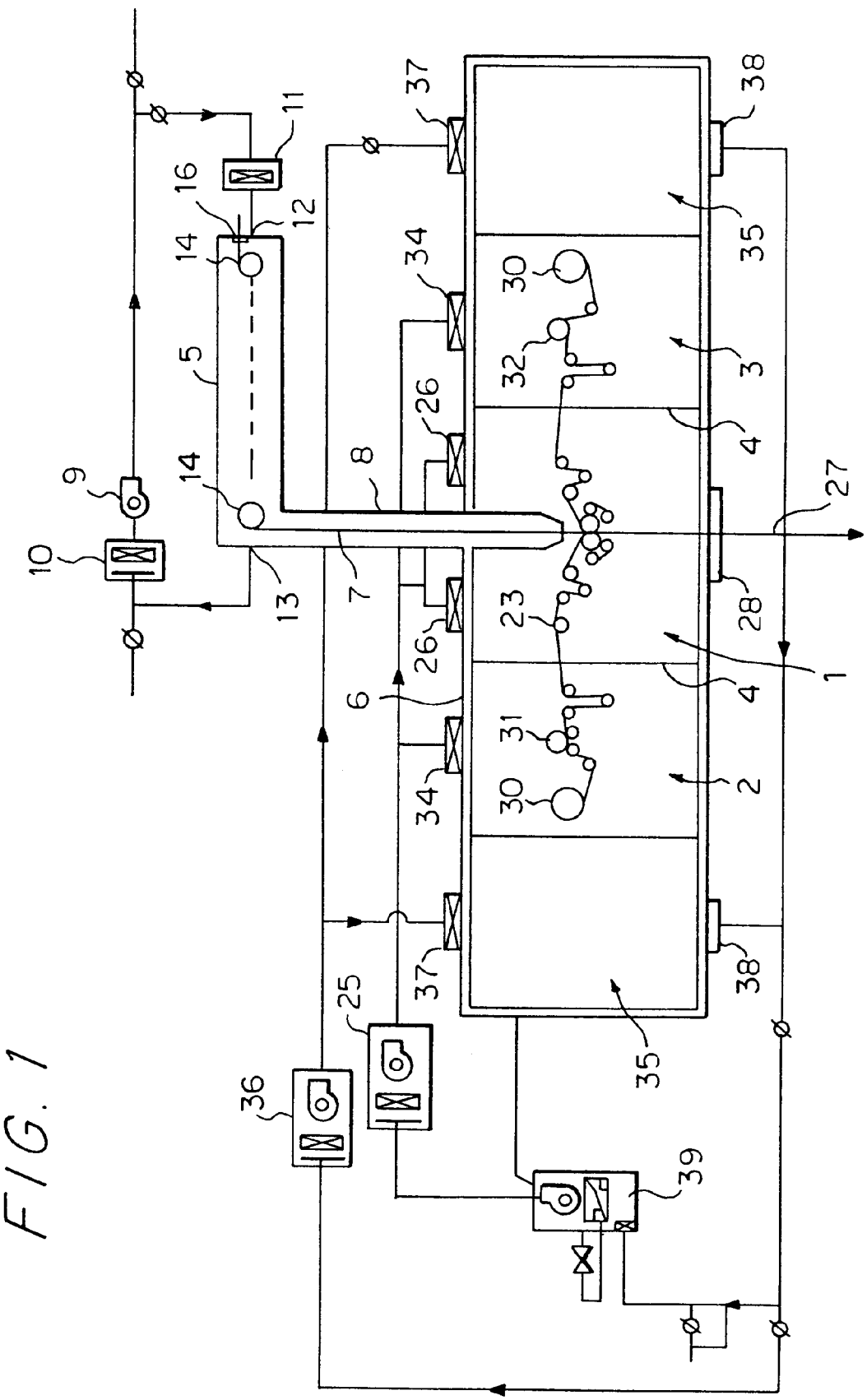
FIG. 1 is a sectional side view showing the essential part of one practical mode of an apparatus for the production of the present invention.
Figure 2:
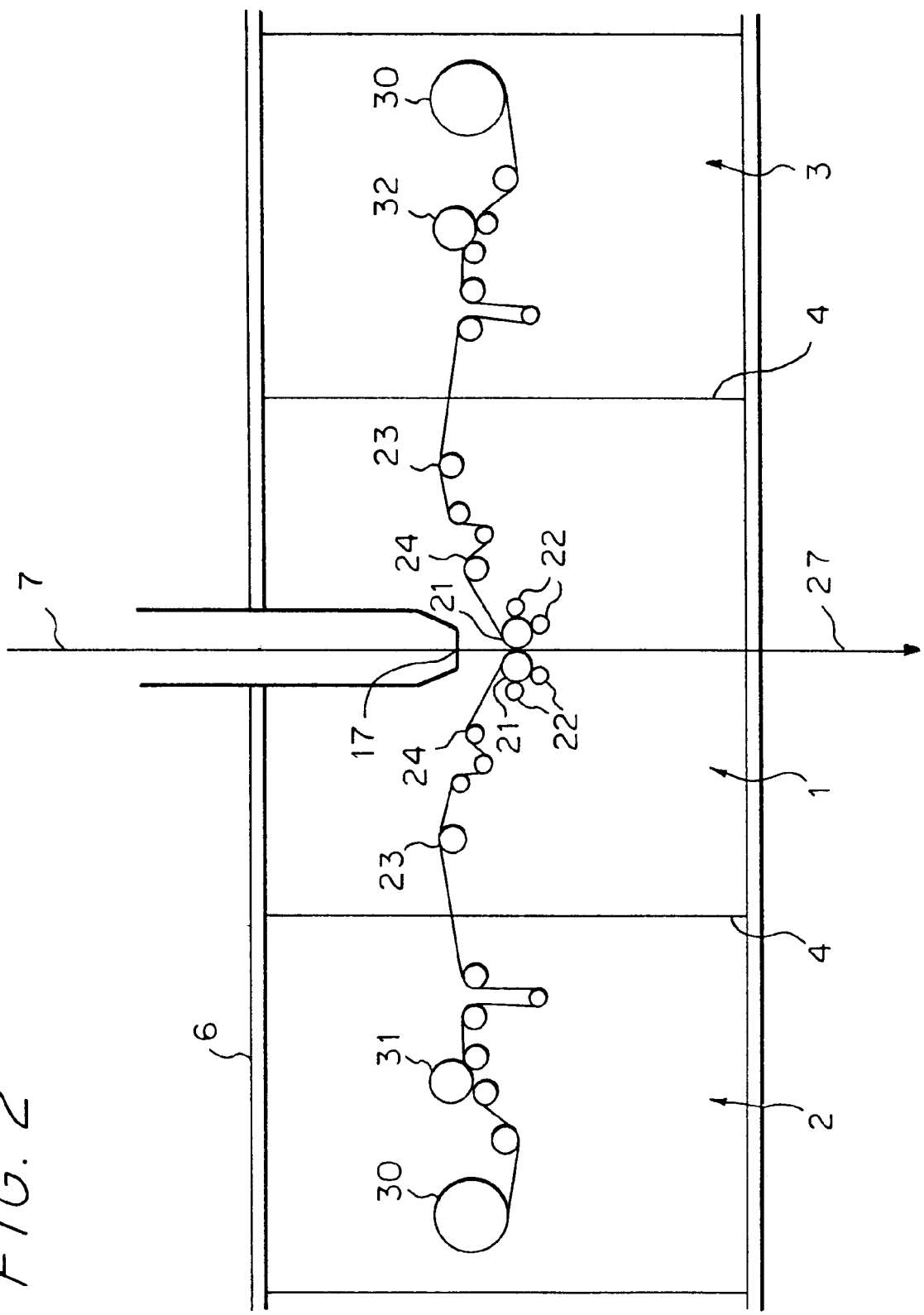
FIG. 2 is a partially enlarged view showing the apparatus for the production shown in FIG. 1.
Figure 3:
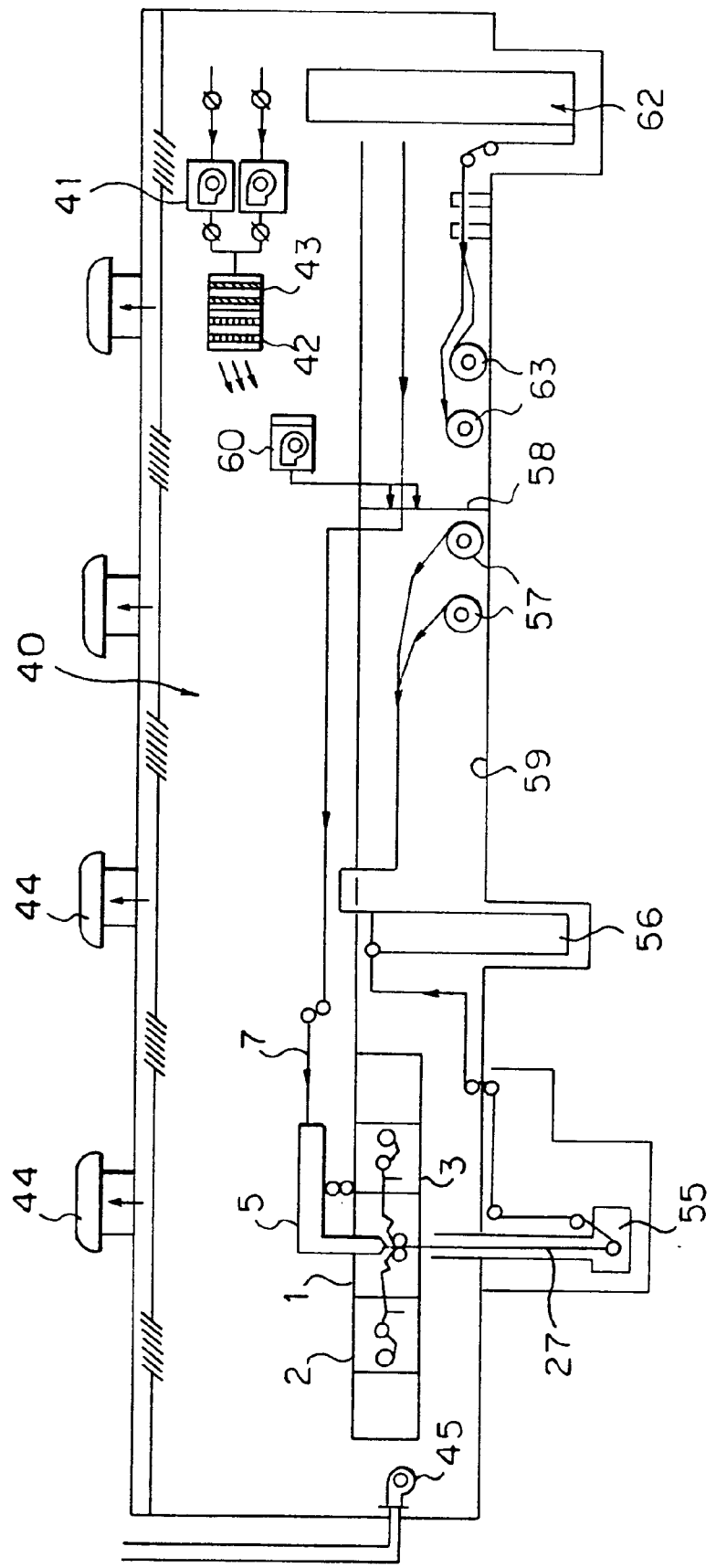
FIG. 3 is a sectional side view showing the whole apparatus for the production shown in FIG. 1.
Figure 4:
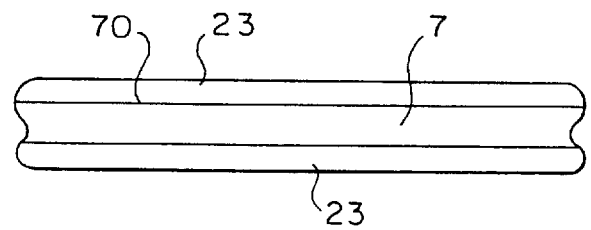
FIG. 4 is a schematic enlarged sectional view showing one example of a laminated metal sheet obtained by the method for production of the present invention.
Figure 5:
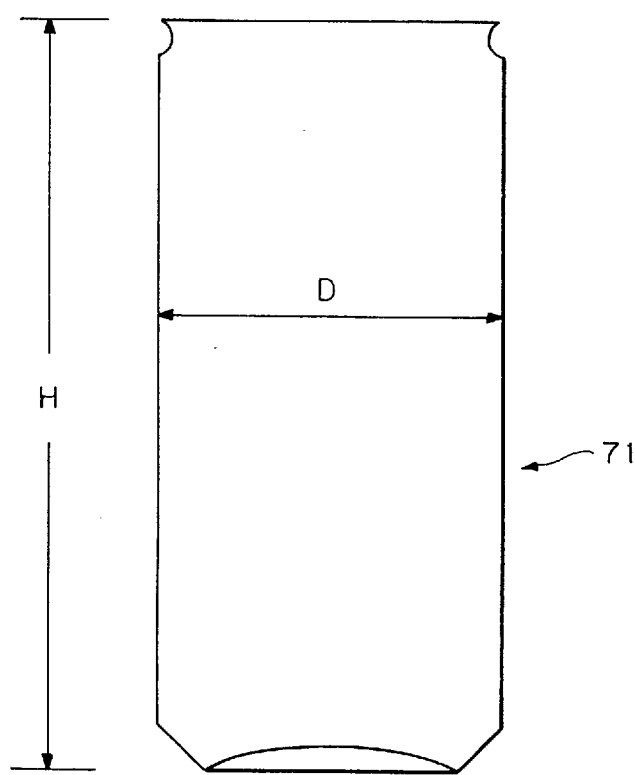
FIG. 5 is a sectional view showing one example of a can container formed of the laminated metal sheet.
Figure 6:
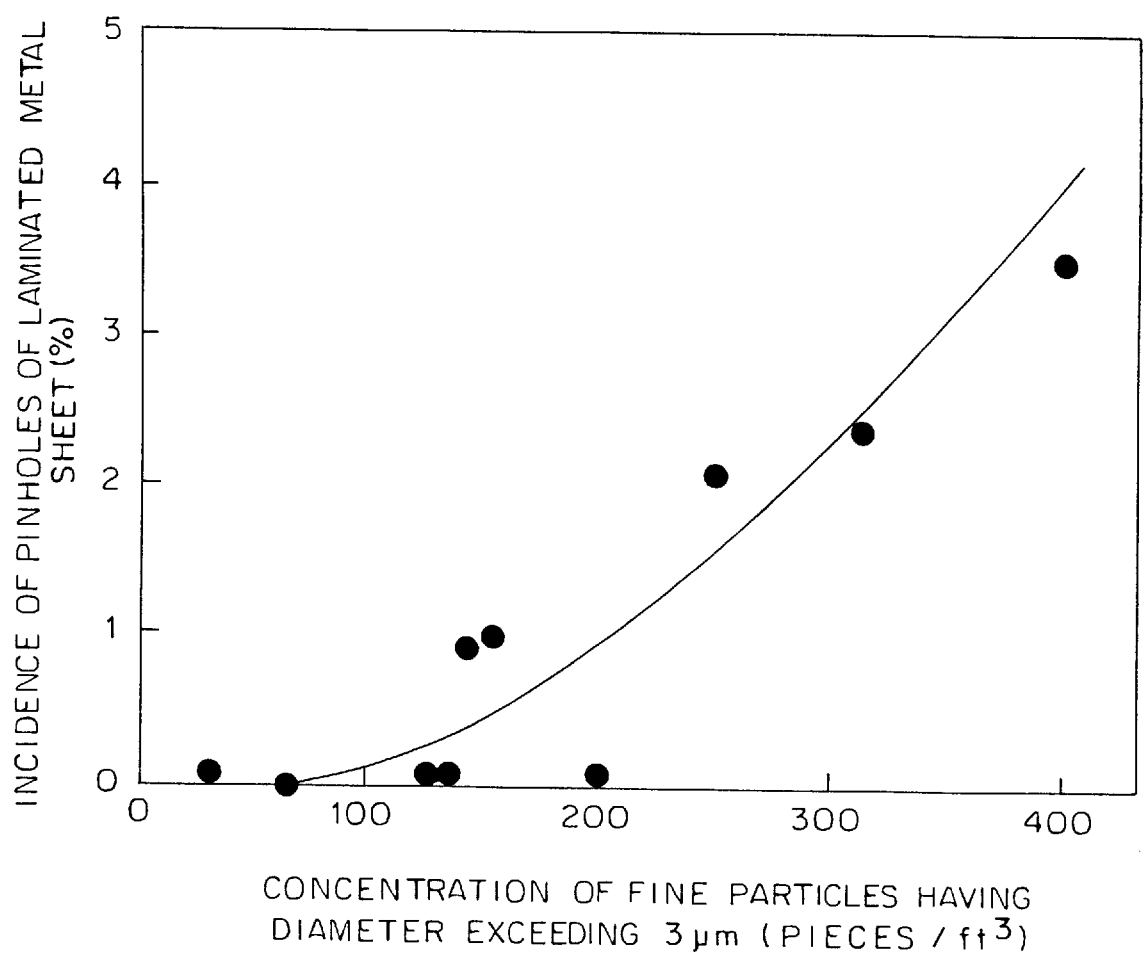
FIG. 6 is a graph showing the relation between the concentration of fine particles in the environment of the laminating process according to the present invention and the incidence of pinholes.
Figure 7:
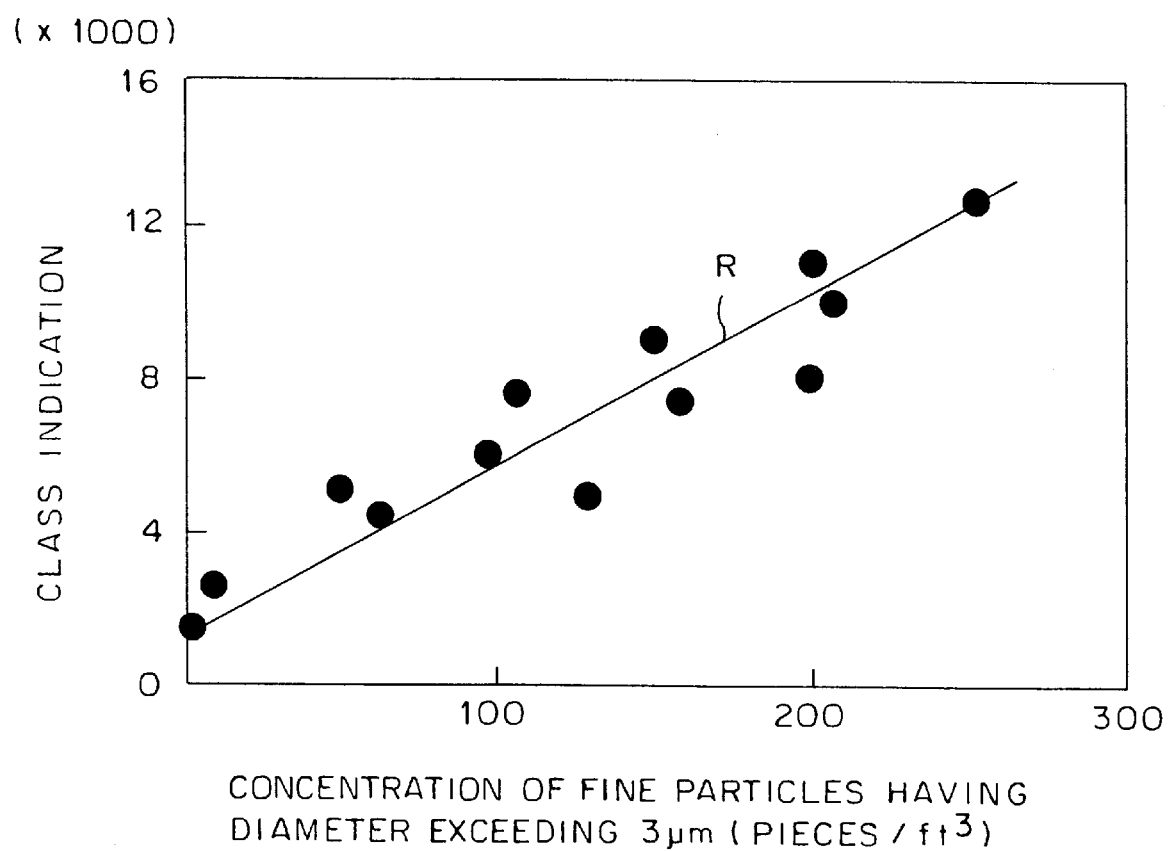
FIG. 7 is a graph showing the relation between the concentration of fine particles having a mean particle diameter exceeding 3 μm and the cleanliness of air of Federal Standards.

Then, referring to drawings, desirable practical modes of the apparatus for production and the method for production of the present invention are explained. FIG. 1 is a sectional side view showing the essential part of one practical mode of apparatus for the production of the present invention. FIG. 2 is a partially enlarged view showing the apparatus for the production shown in FIG. 1. FIG. 3 is a sectional side view showing the whole apparatus for the production shown in FIG. 1. FIG. 4 is a schematic enlarged sectional view showing one example of a laminated metal sheet obtained by the method for production of the present invention. FIG. 5 is a sectional view showing one example of can container formed of the laminated metal sheet. FIG. 6 is a graph showing the relation between the concentration of fine particles in the environment of the laminating process according to the present invention and the incidence of pinholes. FIG. 7 is a graph showing the relation between the concentration of fine particles having a mean particle diameter exceeding 3 m and the cleanliness of air of Federal Standards.

In FIGS. 1 and 2, numeral 1 designates a laminating chamber, numerals 2 and 3 designate uncoiler (unwinder) chambers which are provided on both sides of the laminating chamber 1 enclosed by partition walls 4, respectively. Heating furnace 5 for heating a metal sheet is provided at the upper portion of laminating chamber 1, and a duct 8 is provided which extends from heating furnace 5 through ceiling 6 of laminating chamber 1 so as to enclose metal sheet 7. Heating furnace 5 is connected with blast port 12 of air sent from an air cleaner comprised of a blower 9 and filters 10 and 11, and further with an exhaust port 13 for exhausting internal air.

Further, heating furnace 5 is provided with a large number of heating rollers 14 for elongating the path of metal sheet 7 in such a manner that the contacting pressure and contacting area can be increased so that the efficiency of heating can be improved. Guide rollers are provided in an outlet of the lower end of duct 8. Heating furnace 5 is preferably a heat exchanger system heater in order to lessen the generation of fine particles. It is desirable that rubber seal 16 is provided at an inlet of heating furnace (right end on the drawing), which rubs both sides of metal sheet 7 so that metal sheet 7 which enters into heating furnace 5 is not accompanied by dust. Further, it is desirable that the same type of rubber seal 17 is provided at an outlet of duct 8. Further, a filter can be used in order to pick up powdered dust in the heater and remove it from the heater.

One pair of laminating rollers 21 and 21 is provided downward of an outlet of the above-mentioned duct 8 at the center of laminating chamber 1, so as to be in contact with each other and rotatable on axes which are parallel to each other. Backup rolls 22 which serve for cooling rolls contact the respective laminating rolls 21 and 21. Further, guide rollers 24 are provided for guiding synthetic resin films 23 which enter into the laminating chamber 1 from uncoiler chambers 2 and 3 adjacent to the laminating chamber 1. The ceiling of laminating chamber 1 is equipped with blast port 26 provided with an air filter for removing dust from air sent from a booster fan 25 for sending air under pressure and thereafter sending air to laminating chamber 1. The above-mentioned booster fan 25 and blast port 26 comprise the first air cleaner. An opening for sending out laminated metal sheet 27 and an exhaust port 28 are provided at the lower part of laminating chamber 1. Further, the opening is desirably provided with a seal for preventing air accompanied by dust from getting into the laminating chamber 1 from the outside. Further, it is desirable that the air flow is in the vertical direction, in order to stabilize the air flow within the laminating chamber.

Uncoilers (unwinders) 30 on which rolls of synthetic resin films 23 are rotatably loaded are arranged in uncoiler chambers 2 and 3. Numerals 31 and 32 seen within the uncoiler chambers designate film rolls which are provided for the next use, respectively. Ceilings of uncoiler chambers 2 and 3 are also equipped with blast ports 34 provided with air filters for removing dust from air sent from the above-mentioned booster fan 25 and thereafter sending air to the uncoiler chambers. The above-mentioned booster fan 25 and blast port 34 comprise the second air cleaner.

Any material which has air tightness and strength needed for maintaining clean air on the inside of the chambers can be used for ceilings, walls, and floors of laminating chamber 1 and uncoiler chambers 2 and 3; the usual ceiling materials, wall materials and floor materials for clean room can be used. The filter of the first air cleaner is of a high performance HEPA film having finer meshes in such an extent that the concentration of fine particles of powdered dust having a mean particle diameter exceeding 3 $\mu$m is kept to be below 100 pieces/ft$^3$ in laminating chamber 1. Further, the filter of the second cleaner has finer meshes in such an extent that the cleanliness beyond class 10000 can be kept within uncoiler chambers 2 and 3.

Numeral 35 in FIG. 1 designates a film preparing chamber. The ceiling of the film preparing chamber 35 is equipped with a blast port 37 for sending air sent from a cleaning blower 36 to film preparing chamber 35. Exhaust ports 28 and 38, which are provided in the floors of laminating chamber 1 and a film preparing chamber 35, are connected with the above-mentioned booster fan 25 through a package air-conditioner 39, or connected directly to cleaning blower 36. Therefore, air filters of booster fan 25 and cleaning blower 36 have only to serve as removing fine particles generated newly in the respective chambers so that cleaning of air in the respective chambers can effectively be accomplished.

As shown in FIG. 3, the above-mentioned laminating chamber 1 and uncoiler chamber 3 are arranged within line structure 40 which houses the the above all of the chambers above-mentioned. The line structure 40 is kept at a moderate temperature and at the cleanliness of air below class 100000, by means of a blower 41 for introducing outer air and an air filter 43 provided with an electric heater 42. Further, the ceiling of line structure 40 is provided with a roof fan 44 for exhaust, and the wall of it is provided with an exhaust fan 45. Conventional electric heater of which the filter is exchanged with one having finer meshes can be used for the air filter 43 and the like. However, a filter for clean room can also be used.

Numeral 55 in FIG. 3 designates a known quenching bath for quenching produced laminated metal sheet 27. Numeral 56 designates a delivery looper for accumulating the laminated metal sheet in exchanging of coil. Numeral 57 designates a tension reel for winding laminated metal sheet 27 alternately. In the present practical mode, airtight chamber 59 which is partitioned by partition wall 58 houses the quenching bath 55, the delivery looper 56 and the tension reel 57. The airtight chamber 59 is kept at the cleanliness below class 5000 by sending clean air into the airtight chamber 59 by air fan 60 with a filter. Accordingly, few fine particles adhere to metal sheet 27, which is the product, when it is wound on tension reel 57.

Herein, numeral 62 in FIG. 3 designates an entry looper for accumulating metal sheet 7 before lamination, and numeral 63 designates payoff reels for supplying alternately metal sheets, respectively. Since these instruments and other supplementary instruments shown in the drawings are substantially the same as the conventional ones, detailed explanation about them is omitted.

In the apparatus for production of laminated metal sheet composed as mentioned above, metal sheet 7 unwound from payoff reel 63 passes entry reel looper 62, thereafter is heated to 200 to 280° C. in heating furnace 5, and enters into laminating chamber 1 through duct 8. In the laminating chamber, synthetic resin films 23, sent out from uncoiler chambers 2 and 3 adjacent to the laminating chamber, are entered into the laminating chamber and are superimposed on both sides of metal sheet 7, and bonded to each other when the superimposed synthetic resin films and the metal sheet pass through between a pair of laminating rolls 21. The obtained laminated metal sheet 27 passes through quenching bath 55 and delivery looper 56 and is wound on tension reel 57.

The above-mentioned bonding process of lamination is carried out in the environment in which the concentration of fine particles with diameter 3 $\mu$m is below 100 pieces/ft$^3$. Accordingly, when a can container shown in FIG. 4 is formed of the laminated metal sheet 27, for example, few pinholes are caused. Further, since uncoiler chambers 2 and 3 adjacent to laminating chamber 1, are kept at the cleanliness below class 20000, fine particles which enter into laminating chamber 1 accompanied by synthetic resin film 23 are extremely few. Therefore, it is easy to keep the cleanliness of laminating chamber 1 to be higher. Further, since a compartment having higher cleanliness is enclosed by other compartments having high cleanliness in such a manner that the whole of line structure 40 is kept at the cleanliness below class 100000, each chamber can effectively be purified.

As metal sheets applicable in the method for the production of the present invention, steel sheet, aluminium, cupper plate, stainless steel sheet, TFS, tin-plated steel sheet and others can be used: However, they are not limited to the above-mentioned materials. Further, as synthetic resin films, polyethylene, polyethylene terephthalate, polypropylene, polyethylene naphthalate and others can be used: However, they are not limited to the above-mentioned materials. Further, the pressure of air supplied by the booster fan is usually about of the order of 20 Aq: However, it is not limited to this pressure.

EXAMPLE

Next, the actual effect of the manufacturing method of the present invention is explained showing concrete examples. As an example, using the apparatus for production shown in FIGS. 1 to 3, a laminated metal sheet in which TFS having 0.26 mm thickness and 980 mm width is laminated with polyethylene terephthalate having 25 $\mu$m thickness and 980 mm width is produced, wherein a mixture of air sent from an air cleaner having high filterability with air sent from another cleaner having higher filterability are supplied into the laminating chamber with various ratios of mixture and at 25 Aq so that the concentration of fine particles is varied.

FIG. 6 shows the results of the incidence of pinholes of each of obtained laminated metal sheet which is measured at intervals of 1 m. The incidence of pinholes is expressed by the number of pinholes per meter length of metal sheet (%), in which the full length of the sample is about 2000 m.

From this graph it is seen that when the concentration of fine particles is below 100 pieces/ft$^3$, the incidence of fine particles is below 0.1% and it does not very wildly. It is also seen that in the region of from 100 to 200 pieces/ft$^3$, it varies from 0% to 1%, and in the region exceeding 200 pieces/ft$^3$, the incidence of fine particles rises together with the rise of the concentration of fine particles.

Further, FIG. 7 shows the results of the correlative relation between the concentration of fine particles with diameter 3 μm and class indication of the cleanliness of air based on Federal Standards which is a general standard for showing the cleanliness of an air-purified enviroment (clean room) obtained from measuring the data. From this graph it is seen that 100 pieces/ft³ concentration of fine particles with diameter 3 μm corresponds nearly to class 5000. However, strictly speaking, the cleanliness of clean room is classified by the concentration of fine particles of powdery dust having diamter beyond 0.5 μm in Federal Standards, and therefore when distribution of fine particles having diameter below 0.5 μm, fine particles having diameter from 0.5 μm to 3.0 μm, and fine particles having diameter exceeding 3.0 μm is significantly different, the above-mentioned correlative relation is not maintained. However, in air purified by an usual air cleaner, the above-mentioned correlative relation is maintained nearly on straight line R. Therefore, in the present invention, class 5000 of Federal Standards can be applied instead of the concentration of fine particles with diameter exceeding 3 μm.

INDUSTRIAL APPLICABILITY

According to the method for production of the present invention, the incidence of pinholes can be reduced to such an extent that it can be neglected, and so defective products caused by pinholes can be almost removed in mass production. Further, by means of the apparatus for the production of the present invention, the above-mentioned method for production can be carried out.

We claim:

1. A method for production of a laminated metal sheet comprising superimposing a heated metal sheet on a synthetic resin film unwound from a film roll, passing the heated metal sheet and the synthetic resin film through a pair of laminating rolls and pressing the two to be laminated with each other, and during lamination maintaining the concentration of fine particles with a mean particle diameter exceeding 3 μm below 100 pieces/ft³.

2. The method of claim 1 comprising further maintaining a concentration of fine particles at a cleanliness level below class 5000, wherein the concentration of fine particles with a mean particle diameter of 0.5 m or greater is kept below 5000 pieces/ft³.

3. A method for a production as claims in claim 2, further comprising carrying out said laminating process and unwinding process under somewhat higher atmospheric pressure than the surrounding atmospheric pressure.

4. A method for a production as claimed in claim 2, comprising unwinding said synthetic resin film from a film roll in an environment of the cleanliness below class 20000 prior to said laminating.

5. A method for a production as claims in claim 4, further comprising carrying out said laminating process and unwinding process under somewhat higher atmospheric pressure than the surrounding atmospheric pressure.

6. A method for a production as claimed in claim 4, further comprising at least one additional step of preparing the synthetic resin film prior to unwinding, quenching the laminated sheet after said laminating, and subsequently rolling said laminated sheet, wherein all said steps of said method are carried out in an outer enclosure, and comprising maintaining the environment of the cleanliness in said outer enclosure below class 100000.

7. A method for a production as claimed in claim 6, further comprising carrying out said laminating process and unwinding process under somewhat higher atmospheric pressure than the surrounding atmospheric pressure.

8. A method for a production as claimed in claim 1, wherein said synthetic resin film is unwound from a film roll in the environment of the cleanliness below class 20000, and thereafter laminated to the metal sheet.

9. A method for a production as claimed in claim 1, wherein the whole production line of a laminated metal sheet is enclosed in the environment of the cleanliness below class 100000.

10. A method for a production as claims in claim 1, wherein said laminating process and unwinding process are carried out under somewhat higher atmospheric pressure than the surrounding atmospheric pressure.

11. An apparatus for a production of laminated metal sheet comprising an uncoiler zone for unwinding synthetic resin film from film roll, and a laminating zone for laminating the unwound synthetic resin film to a heated metal sheet, wherein said laminating zone is provided in a laminating chamber isolated from other zones, and an air cleaner is provided for keeping said laminating chamber clean in such a manner that the concentration of fine particles having a mean particle diameter exceeding 3 μm is kept below 100 pieces/ft³.

12. The apparatus of claim 11 wherein said air cleaner further comprises means for maintaining a concentration of fine particles at a cleanliness level below class 5000, wherein the concentration of fine particles with a mean particle diameter of 0.5 m or greater is kept below 5000 pieces/ft³.

13. An apparatus for production as claimed in claim 12, further comprising device for keeping the pressure in said uncoiler chamber and said laminating chamber at somewhat higher atmospheric pressure than the surrounding atmospheric pressure.

14. An apparatus for a production as claimed in claim 12, wherein said uncoiler zone is provided in an uncoiler chamber for isolating said uncoiler zone from other zones, and a second air cleaner is provided for keeping the cleanliness of said uncoiler chamber at a cleanliness level below class 20000.

15. An apparatus for production as claimed in claim 14, further comprising a pressuring device for keeping the pressure in said uncoiler chamber and said laminating chamber at somewhat higher atmospheric pressure than the surrounding atmospheric pressure.

16. An apparatus for a production as claimed in claim 14, further comprising an enclosure which houses the whole production line of said apparatus including said uncoiler chamber and said laminating chamber, and a third air cleaner is provided for keeping the cleanliness of said enclosure to be below 100000.

17. An apparatus for production as claimed in claim 16, further comprising a pressuring device for keeping the pressure in said uncoiler chamber and said laminating chamber at somewhat higher atmospheric pressure than the surrounding atmospheric pressure.

18. An apparatus for a production as claimed in claim 11, wherein said uncoiler division is provided in an uncoiler chamber for isolating said uncoiler division from other divisions, and a second air cleaner is provided for keeping the cleanliness of said uncoiler chamber to be the cleanliness below class 20000.

19. An apparatus for a production as claimed in claim 11, wherein a line structure houses the whole production line of a laminated metal sheet including said uncoiler chamber and said laminating chamber, and a third air cleaner is provided for keeping the cleanliness of said line structure to be below 100000.

20. An apparatus for production as claimed in claim 11, wherein a pressuring equipment is provided for keeping the pressure in said uncoiler chamber and said laminating chamber at somewhat higher atmospheric pressure than the surrounding atmospheric pressure.

* * * * *

UNITED STATES PATENT AND TRADEMARK OFFICE
CERTIFICATE OF CORRECTION

PATENT NO. : 5,992,493
DATED : Nov. 30, 1998
INVENTOR(S) : Kenji Yasunaka et al.

It is certified that error appears in the above-identified patent and that said Letters Patent is hereby corrected as shown below:

Column 7, line 39, (Claim 2, line 4), delete "m" and insert therefor --μm--;

Column 8, line 22, (Claim 12, line 5), delete "m" and insert therefor --μm--.

Signed and Sealed this

Fourteenth Day of November, 2000

Attest:

Q. TODD DICKINSON

*Attesting Officer*            *Director of Patents and Trademarks*